United States Patent
Mizukami et al.

(10) Patent No.: US 10,415,717 B2
(45) Date of Patent: Sep. 17, 2019

(54) CONTROL VALVE DEVICE

(71) Applicant: KYB Corporation, Tokyo (JP)

(72) Inventors: Shota Mizukami, Kanagawa (JP); Akio Matsuura, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/524,914

(22) PCT Filed: Oct. 28, 2015

(86) PCT No.: PCT/JP2015/080445
§ 371 (c)(1),
(2) Date: May 5, 2017

(87) PCT Pub. No.: WO2016/072333
PCT Pub. Date: May 12, 2016

(65) Prior Publication Data
US 2017/0350524 A1    Dec. 7, 2017

(30) Foreign Application Priority Data

Nov. 7, 2014    (JP) .................................. 2014-227014

(51) Int. Cl.
*F16K 27/02* (2006.01)
*F15B 13/04* (2006.01)
(Continued)

(52) U.S. Cl.
CPC ...... *F16K 27/0254* (2013.01); *F15B 13/0405* (2013.01); *F16K 1/523* (2013.01); *E02F 9/2267* (2013.01); *F15B 21/005* (2013.01); *F15B 2013/004* (2013.01); *F15B 2013/041* (2013.01); *F15B 2211/40507* (2013.01); *F15B 2211/411* (2013.01); *F15B 2211/41581* (2013.01); *F15B 2211/423* (2013.01); *F15B 2211/46* (2013.01);
(Continued)

(58) Field of Classification Search
CPC ................. F16K 27/0254; F16K 1/523; F15B 2211/40507; F15B 2211/411; F15B 2211/41581; F15B 2211/423; F15B 2211/46; F15B 2211/75; F15B 2211/8636; F15B 13/0405; F15B 21/005; F15B 2013/004; F15B 2013/041; E02F 9/2267
USPC ............................................ 137/469, 516.25
See application file for complete search history.

(56) References Cited

U.S. PATENT DOCUMENTS

| | | | | |
|---|---|---|---|---|
| 1,668,453 | A | * 5/1928 | Graesser | ................. F16K 17/10 137/516 |
| 2,431,769 | A | * 12/1947 | Parker | ................... F16K 15/026 137/469 |
| 4,566,486 | A | * 1/1986 | Taylor | ................. F16K 17/0406 137/469 |

FOREIGN PATENT DOCUMENTS

| | | |
|---|---|---|
| CN | 203756088 U | 8/2014 |
| JP | H05-302682 A | 11/1993 |

(Continued)

*Primary Examiner* — P. Macade Nichols
(74) *Attorney, Agent, or Firm* — Rabin & Berdo, P.C.

(57) ABSTRACT

A control valve device includes a valve main body formed to have an actuator port connected to an actuator, a communication passage formed in the valve main body and configured to allow the actuator port to communicate with a drain port, and an on/off valve provided between the communication passage and the drain port, and the on/off valve includes a seat member assembled to the valve main body, an orifice provided in the seat member, and a poppet member configured to open and close a seat portion of the seat member.

5 Claims, 2 Drawing Sheets

(51) Int. Cl.
*F16K 1/52* (2006.01)
*F15B 13/00* (2006.01)
*E02F 9/22* (2006.01)
*F15B 21/00* (2006.01)

(52) U.S. Cl.
CPC ... *F15B 2211/75* (2013.01); *F15B 2211/8636* (2013.01)

(56) References Cited

FOREIGN PATENT DOCUMENTS

| | | |
|---|---|---|
| JP | 2002-081406 A | 3/2002 |
| JP | 2009-209999 A | 9/2009 |

* cited by examiner

CONTROL VALVE DEVICE

TECHNICAL FIELD

The present invention relates to a control valve device.

BACKGROUND ART

A control valve device disclosed in JP2009-209999A is known as a control valve device including an on/off valve for returning a working fluid in an actuator to a drain port, for example. In this conventional control valve device, a sub-block is provided separately to a valve main body, and the described on/off valve is provided in this sub-block. When the spool or the like is locked and an actuator that is connected to an actuator port cannot be activated, by opening the on/off valve, the working fluid in the actuator is returned to the drain port.

SUMMARY OF INVENTION

In the conventional control valve device in which an on/off valve is provided to the sub-block, the sub-block needs to be provided separately to the valve main body. Therefore, the number of components increases by the number of the sub-blocks, which thus causes a problem that the entire control valve device increases in size.

A control valve device shown in FIG. 2 is considered to be a control valve device that solves this problem.

In this control valve device, a spool (not illustrated) is slidably assembled to a valve main body b, and a valve main body b is formed to have an actuator port 1 connected to an actuator (not illustrated). The control valve device is configured to allow the actuator port 1 to communicate with a supplying side of working oil, or with a returning side thereof, according to a moved position of the spool.

The valve main body b is formed to have an assembling hole 2 in which an on/off valve v is assembled. This assembling hole 2 is opened on a plane of the valve main body b on which an opening of the actuator port 1 is formed.

Furthermore, at the on/off valve v, a valve body 3 of the on/off valve v is assembled to the assembling hole 2, and to this valve body 3, a poppet member 4 is assembled movably in an axis direction. This poppet member 4 opens and closes a seat portion 5 directly formed to the valve main body b, with a poppet portion 4a.

The poppet member 4 is held down by a plug 6 screwed onto the valve body 3. Furthermore, by fastening the plug 6, the poppet portion 4a closes the seat portion 5. On the other hand, by loosening the plug 6, the poppet member 4 becomes movable in a direction separating from the seat portion 5.

The poppet portion 4a of the poppet member 4 communicates with the actuator port 1 via an orifice 7 formed directly on the valve main body b and a communication passage 8. Moreover, a drain port 9 is formed downstream of the seat portion 5 with respect to a flow flowing from the orifice 7 to the seat portion 5. Therefore, when the seat portion 5 opens, the actuator port 1 communicates with the drain port 9 via the orifice 7.

The member shown by the reference sign 10 in the drawing is a tightening nut fit to the plug 6. By tightening this tightening nut 10, the fastened position of the plug 6 is maintained.

In such a control valve device, when the spool (not illustrated) is operating normally, the plug 6 is fastened, and the seat portion 5 is maintained closed by the poppet portion 4a of the poppet member 4.

If the spool locks, and for example a bucket stops at a high position in a state in which a boom of a power shovel is raised, the operator loosens the plug 6 of the on/off valve v that communicates with the actuator port 1 connected to the boom cylinder. By loosening the plug 6, the poppet member 4 moves in a direction separating from the seat portion 5 due to a function of load pressure of the boom cylinder, and opens the seat portion 5.

Once the seat portion 5 opens as described above, the actuator port 1 communicates with the drain port 9 via the communication passage 8, the orifice 7, and the seat portion 5, and thus the return fluid from the boom cylinder will drain from the drain port 9 while a throttle resistance is applied at the orifice 7. Therefore, the boom cylinder contracts slowly in accordance with the throttle resistance of the orifice 7 to lower the bucket to a given position.

In the control valve device shown in FIG. 2, the orifice 7 is directly formed on the valve main body b and are integrated into one. Therefore, for example, even when just the diameter of the orifice 7 is to be changed without changing the specification of the valve main body b other than the diameter of the orifice 7, it is necessary to replace the valve main body b. In other words, a valve main body b needs to be prepared for each different orifice diameter.

Furthermore, practically, there are cases in which just the diameter of the orifice 7 requires to be changed according to, for example, the empty weight and volume of the actuator, while sharing the valve main body b between a plurality of actuators. However, there is a problem with the control valve device shown in FIG. 2 that the orifice diameter cannot be changed solely while sharing the valve main body b.

Moreover, when the so-called mother machines are different, although it is possible to share a valve main body b between these machine types, there are cases in which the valve main body b itself needs to be changed just because the requested diameter of the orifice 7 differs. This becomes a large burden on the suppliers.

An object of the present invention is to provide a control valve device that allows for changing just the orifice diameter while sharing a common valve main body.

According to one aspect of the present invention, a control valve device includes a valve main body formed to have an actuator port connected to an actuator, a communication passage formed in the valve main body and configured to allow the actuator port to communicate with a drain port, and an on/off valve provided between the communication passage and the drain port. The on/off valve includes a seat member assembled to the valve main body, an orifice provided in the seat member, and a poppet member configured to open and close a seat portion of the seat member.

DESCRIPTION OF EMBODIMENTS

Figure 1:
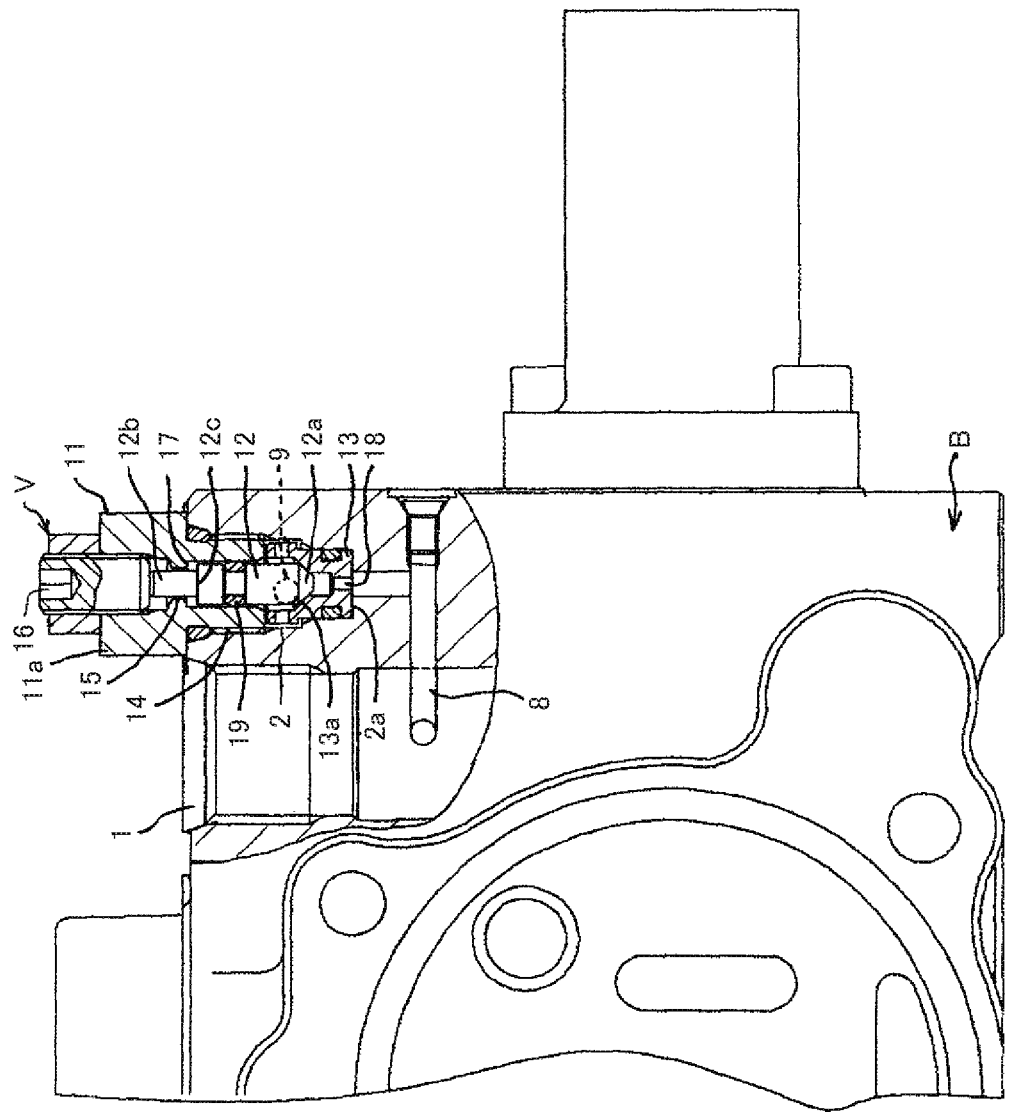
FIG. 1 is a partial sectional view showing an essential part of an embodiment of the present invention.
Figure 2:
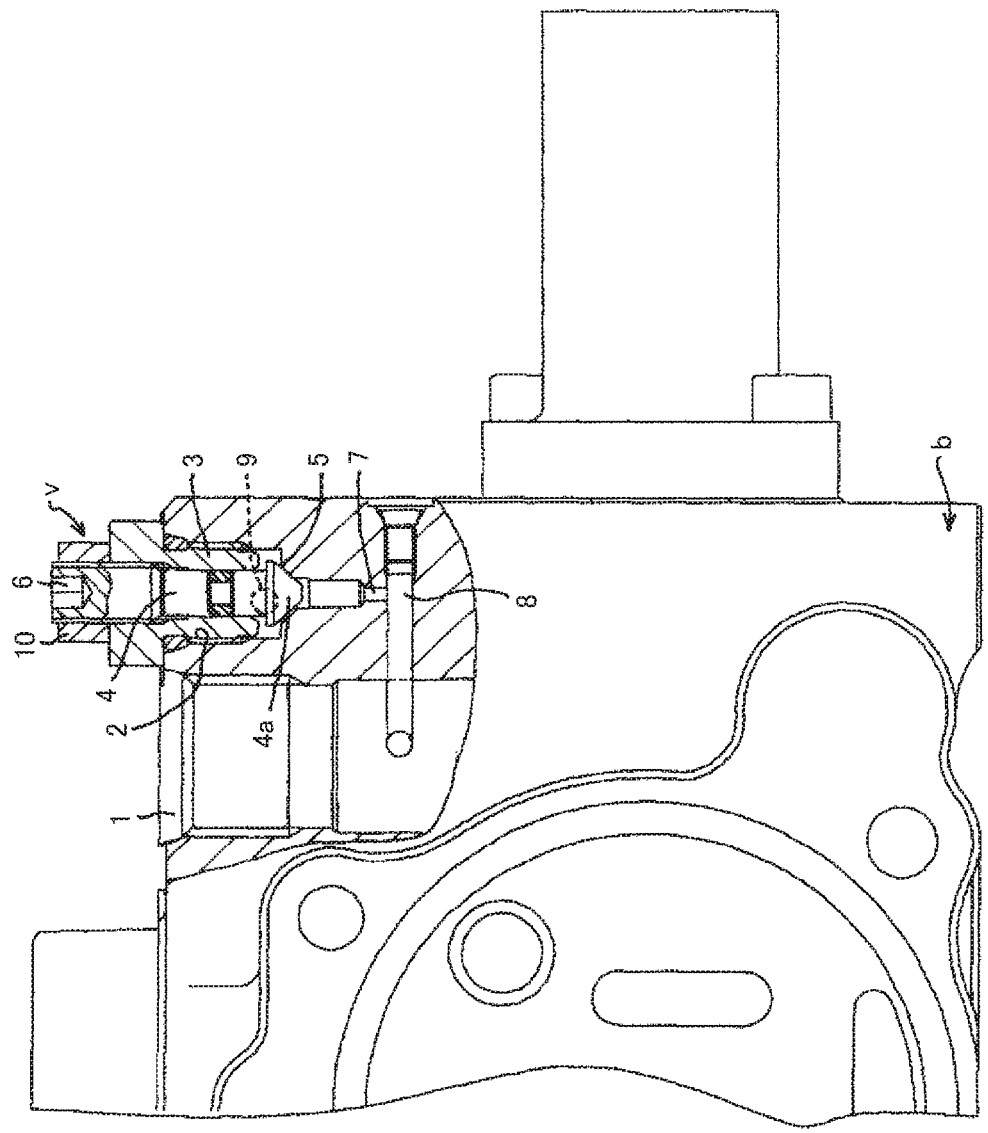
FIG. 2 is a partial sectional view showing an essential part of a related control valve device.

FIG. 1 is a partial sectional view showing an embodiment of the present invention. Identical elements to those in the control valve device shown in FIG. 2 will be described using identical reference signs.

In a valve main body B of the present embodiment, a spool (not illustrated) is assembled in a slidable manner. Moreover, the valve main body B is formed to have an actuator port 1 connected to an actuator (not illustrated). The control valve device is configured to allow the actuator port 1 to communicate with the supplying side of working fluid, or with a returning side thereof, according to a moved position of the spool.

The valve main body B is formed to have an assembling hole 2 in which an on/off valve V is assembled. This assembling hole 2 is opened on a plane of the valve main body B on which an opening of the actuator port 1 is formed.

The on/off valve V includes a valve body 11, a poppet member 12 assembled movably in an axis direction to this on/off valve body 11, and a seat member 11. The valve body 11 is fastened to the valve main body B with a screw 14. The seat member 13 is sandwiched between this valve body 11 and a bottom portion 2a of the assembling hole 2.

The poppet member 12, which is assembled movably in the valve main body 11, is configured to open and close a seat portion 13a formed in the seat member 13, with a poppet portion 12a formed on a tip of the poppet member 12. Such a poppet member 12 is formed with a small diameter portion 12b on an opposite side to the poppet portion 12a, and this small diameter portion 12b projects outwards from a small hole 15 formed in the valve main body 11. Furthermore, a projecting tip of the small diameter portion 12b is held down by a plug 16 screwed onto the valve body 11.

An annular projection 12c is formed on the poppet member 12, more specifically at a root of the small diameter portion 12b, and a step portion 17 is formed on an opening part of the small hole 15. A stopper mechanism is formed by the annular projection 12c and the step portion 17. This stopper mechanism prevents the poppet member 12 from coming out from the valve body 11 and causing the working fluid to flow out externally. Moreover, the poppet member 12 is movable between the seat portion 13a and the step portion 17.

An orifice 18 is formed in the seat member 13 of the on/off valve V. Via this orifice 18 and the seat portion 13a, the communication passage 8 communicates with the drain port 9.

The member shown by the reference sign 19 in the drawings is a seal member that is wound around the poppet member 12.

Next described is a procedure to assemble the on/off valve V to the valve main body B.

First, the poppet member 12 is inserted into the valve body 11 in advance, and the small diameter portion 12b is inserted through the small hole 15. At this time, friction of the seal member 19 prevents the falling off of the poppet member 12 from the valve body 11.

The seat member 13 is inserted into the assembling hole 2, and the seat member 13 is adhered closely to the bottom portion 2a. The valve body 11, in which the poppet member 12 is assembled in advance, is inserted into the assembling hole 2 while rotated to fasten the screw 14.

In a state in which a large diameter portion 11a of the valve body 11 contacts a surface of the valve main body B, a gap is formed between the annular projection 12c and the step portion 17. In other words, the poppet member 12 is held movable between the seat portion 13a and the step portion 17. By fastening the plug 16 at this state, the poppet portion 12a of the poppet member 12 is brought into contact with the seat portion 13a, and closes the seat portion 13a.

Next, functions of this embodiment will be described.

When the spool can operate normally, the plug 16 is fastened, and the seat portion 13a is maintained closed by the poppet portion 12a.

If the spool locks, and for example, the bucket stops at a high position in a state in which the boom of the power shovel is raised, the operator is to loosen the plug 16 of the on/off valve V that communicates with the actuator port 1 connected to the boom cylinder. If the plug 16 is loosened, the poppet member 12 moves until the annular projection 12c bumps into the step portion 17 by the function of load pressure of the boom cylinder, and opens the seat portion 13a.

Once the seat portion 13a opens, the actuator port 1 communicates with the drain port 9 via the communication passage 8, the orifice 18, and the seat portion 13a. Therefore, the return fluid from the boom cylinder will drain from the drain port 9 while a throttle resistance is applied at the orifice 18. Therefore, the boom cylinder contracts slowly in accordance with the throttle resistance of the orifice 18 to lower the bucket to a given position.

According to the present control valve device, it is possible to freely select the seat member 13, in which the orifice 18 is formed, with respect to the valve main body B; therefore, it is possible to freely select the orifice 18 together with the seat member 13 while sharing the valve main body B, for example.

Moreover, the stopper mechanism is provided in the on/off valve V, so there is no fear of the poppet member 12 coming out from the valve main body B and the working fluid gushing externally.

The concept of the working fluid in this invention includes working oil, water, gas and the like.

The following describes the configuration, functions, and effects of the embodiment of the present invention collectively.

The present embodiment relates to a control valve device including an on/off valve V for returning working fluid within an actuator to a drain port 9 when, for example, a spool or the like locks and the actuator that is connected to an actuator port 1 cannot be operated. In the control valve device, an on/off valve V is assembled to the valve main body B. This on/off valve V includes a seat member 13 assembled to the valve main body B, an orifice 18 formed in the seat member 13, and a poppet member 12 configured to open and close a seat portion 13a of the seat member 13.

This control valve device allows the actuator port 1 to communicate with the drain port 9 when the on/off valve V is open. At this time, by the orifice 18 formed in the seat member 13, a throttle resistance is applied to the working fluid leaded to the drain port 9, which thus restricts a moving velocity of the actuator.

According to this embodiment, the seat member 13 of the on/off valve V is assembled to the valve main body B, and the orifice 18 is formed in this seat member 13; by replacing just the seat member 13 with respect to the valve main body B, it is possible to freely select an orifice diameter. Therefore, it is possible to freely change the orifice diameter of the on/off valve V while sharing the valve main body B. That is to say, it is possible to overcome the problem of requiring to change the valve main body B every time the orifice diameter differs.

Moreover, in the present embodiment, the on/off valve V includes a valve body 11 that holds the poppet member 12 in a movable manner. The seat member 13 and the valve body 11 are assembled in the valve main body B. The valve body 11 is formed with a step portion 17, and the poppet member 12 is formed with an annular projection 12c. By the step portion 17 and the annular projection 12c, a stopper mechanism of the poppet member 12 is formed. Therefore, even if the plug 16 comes out from the valve body 11, the poppet member 12 will be held down by the stopper mechanism.

According to this embodiment, the poppet member 12 is held down by the stopper mechanism; thus, the poppet member 12 will not come out from the valve body 11.

The present embodiment is used as a control valve device used in construction machinery such as a power shovel, and for example is optimum as a device for lowering a boom and forcibly lowering a bucket to the ground when the spool of the control valve that controls the boom is locked in a state in which the boom is raised.

Embodiments of this invention were described above, but the above embodiments are merely examples of applications of this invention, and the technical scope of this invention is not limited to the specific constitutions of the above embodiments.

This application claims priority based on Japanese Patent Application No. 2014-227014 filed with the Japan Patent Office on Nov. 7, 2014, the entire contents of which are incorporated into this specification.

The invention claimed is:

1. A control valve device, comprising:
   a valve main body formed to have an actuator port connected to an actuator;
   a communication passage formed in the valve main body, and being configured to allow the actuator port to communicate with a drain port; and
   an on/off valve provided between the communication passage and the drain port, wherein the on/off valve comprises:
   a seat member assembled to the valve main body;
   an orifice provided in the seat member;
   a poppet member configured to open and close a seat portion of the seat member,
   a valve body configured to hold the poppet member in a movable manner;
   a step portion formed in the valve body; and
   an annular projection formed in the poppet member, the annular projection and the step portion forming a stopper mechanism.

2. The control valve device according to claim 1, wherein the seat member is sandwiched between the valve body and the valve main body.

3. The control valve device according to claim 1, wherein the on/off valve further comprises a plug screwed to the valve body, the plug being configured to press the poppet member in a valve closing direction, and the poppet member abuts against the plug when the on/off valve is closed.

4. The control valve device according to claim 1, wherein the stopper mechanism is configured to prevent the poppet member from coming out from the valve body and from causing a working fluid to flow out from the valve body to an outside.

5. The control valve device according to claim 1, wherein the step portion has an inner dimension smaller than an outer dimension of the annular projection.

* * * * *